Patented Mar. 31, 1936

2,035,541

UNITED STATES PATENT OFFICE 2,035,541

ABSORBENT WORKING FLUIDS

Joseph Fleischer, Dayton, Ohio, assignor, by mesne assignments, to General Motors Corporation, a corporation of Delaware No Drawing. Application May 20, 1931, Serial No. 538,889

14 Claims. (Cl. 252—5)

This invention relates to chemistry, and more particularly to chemical working fluids for use in absorption refrigerating machines.

The halo-fluoro derivatives of aliphatic hydrocarbons have become of great importance as refrigerants in the compression refrigerating machines due to their relative non-toxic, non-inflammable, and non-corrosive properties. Examples of such compounds are $CHCl_2F$, $CCl_2F_2$, $C_2Cl_2F_4$, $C_2H_2ClF_3$, $C_2Cl_2F_3$, and $C_3H_2F_3Br_3$. This group of compounds has thus far not become available as refrigerants in the absorption refrigerating machines due to the absence of a suitable solid or liquid absorbent.

The objects of my invention are to make available for use in absorption refrigerating machines certain of the halo-fluoro derivatives by providing a working fluid consisting of a halo-fluoro derivative as the refrigerant and an organic compound containing oxygen attached either to one or two carbon atoms as the liquid absorbent. More particularly, I provide a working fluid consisting of a halo-fluoro derivative of an aliphatic hydrocarbon having the structure of chloroform as the refrigerant and a member of the ester, ether, or mixed ester-ether groups as an absorbent.

In absorption refrigerating machines, refrigeration is generally produced by the evaporation of a liquid refrigerant, the vapors being absorbed in an absorbent material at a low pressure and liberated therefrom at a higher pressure. The liberated vapors are generally recondensed and returned to be re-evaporated. The absorbent material and the refrigerant are termed the working fluid. To be successful in producing efficient practical results, the working fluid should include an absorbent capable of liberating and absorbing a large amount of refrigerant per unit volume of absorbent.

I have found that members of the halo-fluoro group of compounds having the structure of chloroform are absorbed in and liberated from certain members of the ester and ether groups in amounts sufficient to produce efficient and practical refrigeration.

The term "chloroform structure" is used to denote any compound of the halo-fluoro group wherein one or more of the chloroform chlorine atoms is or are replaced by a halogen atom and/or a carbon atom. For example, $CCl_2HF$ has a chloroform structure as the term is herein used because one chlorine atom of the chloroform molecule is replaced by fluorine. Likewise, $CHF_2$—$CHClF$ has a chloroform structure because one of the chlorine atoms of the chloroform molecule is replaced by fluorine and another by the group $CHF_2$.

Other examples of halo-fluoro compounds having the chloroform structure are ($CHF_2$—$CHF_2$), $CHBrF_2$, and $CHBr_2F$.

The chemical activity or absorption of such compounds probably has its origin in the polar nature of the hydrogen atom of the chloroform molecule. The greater the number of polar or "chloroform hydrogen atoms" present in the molecule, the greater is the chemical activity or absorption. For example, $CHClF$—$CHF_2$, trifluoromonochloroethane, wherein there are two polar hydrogen atoms, is absorbed to a greater extent than $CCl_2HF$ wherein there is but a single polar hydrogen atom.

I have found that the esters, ethers, and mixed esters and ethers are particularly adaptable as absorbents for these halo-fluoro compounds of chloroform structure, due to the attractive forces which I have found exist between such compounds.

The active part of the ether molecule is the oxygen atom. The underlined part of the

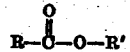

group is the active group of the esters. Increasing the number of active groups in the molecule of either the ethers or the esters increases the absorptive power of that compound. That is, the di and tri ethers and the di esters are better absorbents than the mono compounds.

As a specific example of my invention, the working fluid may consist of monofluorodichloromethane, having the formula $CCl_2HF$, as the refrigerant, and dibutyl phthalate, having the formula $C_6H_4(COOC_4H_9)_2$, as the absorbent. Monofluorodichloromethane has the chloroform structure, containing one polar hydrogen atom. The phthalate is an ester, specifically a di-ester containing in each molecule two active groups as outlined above.

In an absorption refrigerating machine utilizing such a working fluid, the monofluorodichloromethane is alternately absorbed in and liberated from the dibutyl phthalate.

As a second example, the working fluid may consist of trifluoromonochloroethane as the refrigerant and ethylene glycol diacetate as the absorbent. The refrigerant in this case contains two active chloroform or polar hydrogen atoms and is absorbed in greater amounts in the ethylene glycol diacetate than the monofluorodichloromethane.

Other esters and ethers may likewise serve as absorbents for CCl₂HF, (CHClF—CHF₂), and other members of the halo-fluoro group having the chloroform structure. The following table shows the absorptive power of certain esters and ethers as calculated from experimental vapor pressure measurements using CHCl₂F as the refrigerant, assuming an evaporator temperature of 20° F.

|  | B. P.° F. | 90° F. absorption wt. % F-21 at equil. | Desorption wt. % F-21 | |
|---|---|---|---|---|
|  |  |  | 220° F. | 260° F. |
|  |  | Percent | Percent | Percent |
| Dibutyl phthalate | 644 | 24 | 12 | 7 |
| Diethyl phthalate | 554 | 25 | 13 | 9 |
| Dimethyl phthalate | 540 | 27 | 14 | 10 |
| Dibutyl oxalate | 470 | 34 | 17 | 14 |
| Butyl butyrate | 329 | 34 | 18 | 15 |
| Diethylene glycol methyl ethyl ether | 329 | 44 | 30 | 22 |
| Ethylene glycol mono ethyl ether acetate | 307 | 40 | 24 | 16 |
| β-ethoxyethyl acetate |  |  |  |  |

While I have given two specific examples of working fluids, it should be understood that my invention includes a working fluid consisting of any of the halo-fluoro compounds having the chloroform structure as the refrigerant and an organic compound containing oxygen attached either to one or two carbon atoms.

Thus I have disclosed a working fluid having practical advantages over all known working fluids. It operates at a low pressure and the refrigerant is itself relatively non-toxic, non-inflammable, and substantially non-corrosive.

What is claimed is as follows:

1. A working fluid for absorption refrigerating machines comprising a di-ester as the absorbent and a halo-fluoro derivative of an aliphatic hydrocarbon having the structure of chloroform as the refrigerant.

2. A working fluid for absorption refrigerating machines comprising an ester as the liquid absorbent and a halo-fluoro derivative of an aliphatic hydrocarbon having the structure of chloroform as the refrigerant.

3. A working fluid for absorption refrigerating machines comprising an ether as the absorbent and a halo-fluoro derivative of an aliphatic hydrocarbon having the structure of chloroform as the refrigerant.

4. A working fluid for absorption refrigerating machines comprising an ester as the absorbent and a halo-fluoro derivative of an aliphatic hydrocarbon having at least two chloroform hydrogen atoms in the molecule as the refrigerant.

5. A working fluid for absorption refrigerating machines comprising dibutyl phthalate as the absorbent and a halo-fluoro derivative of an aliphatic hydrocarbon having the structure of chloroform as the refrigerant.

6. A working fluid for absorption refrigerating machines comprising dibutyl phthalate as the absorbent and a halo-fluoro derivative of an aliphatic hydrocarbon having at least two chloroform hydrogen atoms as the refrigerant.

7. A working fluid for absorption refrigerating machines comprising dibutyl phthalate as the absorbent and monofluorodichloromethane as the refrigerant.

8. A working fluid for absorption refrigerating machines comprising dibutyl phthalate as the absorbent and monochlorotrifluoroethane as the refrigerant.

9. A working fluid for absorption refrigerating machines comprising a dialkyl phthalate as the absorbent and a halo-fluoro derivative of an aliphatic hydrocarbon having the structure of chloroform as the refrigerant.

10. A working fluid for absorption refrigerating machines comprising a dialkyl phthalate as the absorbent and a halo-fluoro derivative of an aliphatic hydrocarbon having at least two chloroform hydrogen atoms in the molecule as the refrigerant.

11. A working fluid for absorption refrigerating machines comprising a mixed ester and ether as the absorbent and a halo-fluoro derivative of an aliphatic hydrocarbon having the structure of chloroform as the refrigerant.

12. A working fluid for absorption refrigerating machines comprising a mixed ester and ether as the absorbent and a halo-fluoro derivative of an aliphatic hydrocarbon having at least two chloroform hydrogen atoms in the molecule as the refrigerant.

13. A working fluid for absorption refrigerating machines comprising dibutyl phthalate as the absorbent and a refrigerant capable of being absorbed by and liberated from the dibutyl phthalate.

14. A working fluid for an absorption refrigerating machine wherein refrigerant vapor is absorbed and liberated from a liquid absorbent by changing the temperature of the absorbent comprising a halo-fluoro derivative of an aliphatic hydrocarbon having the structure of chloroform as the refrigerant existing under different conditions in the liquid and vapor states and an organic compound containing oxygen attached to either one or two organic radicals capable of absorbing and liberating the vapor of said derivative under different temperature conditions while remaining in the liquid state.

JOSEPH FLEISCHER.